Aug. 22, 1950 C. V. WOLFE 2,519,990
PRESSURE RELIEF MECHANISM
Filed April 26, 1947

INVENTOR.
CHARLES V. WOLFE,
BY: Harold B. Hood.
ATTORNEY.

Patented Aug. 22, 1950

2,519,990

UNITED STATES PATENT OFFICE 2,519,990

PRESSURE RELIEF MECHANISM

Charles V. Wolfe, Indianapolis, Ind., assignor to
E. C. Atkins and Company, Indianapolis, Ind.,
a corporation of Indiana Application April 26, 1947, Serial No. 744,274

12 Claims. (Cl. 184—11)

1

The high speed rotation of parts within a substantially fluid-tight, lubricant-containing gear box results, at times, in building up a fluid pressure within such box; and the pressure differential between the inside and the outside of the box will sometimes cause lubricant to escape. In many installations, it is substantially essential to prevent such escape of lubricant, either because the equipment is used in an environment wherein escaping lubricant might contaminate the work or injure parts of the same machine which are subject to damage by contact with oil, or because the equipment is used under circumstances such that frequent replenishment of the lubricant supply is not feasible, or for other reasons.

It is desirable, therefore, to provide means for overcoming the tendency of lubricant to escape from the gear housing; and I propose to accomplish that result by providing means for relieving the pressure so built up by permitting the escape of air from the interior of the gear box, during operation of the equipment only, and without permitting the escape of lubricant through the air escape path. It is the primary object of the present invention, then, to provide, in combination with a substantially fluid-tight housing in which a rotating part is journalled, means for permitting the escape of gas from the interior of such a housing, only during operation of the equipment, and without permitting the escape of liquid through the gas-escape path. A further object of the invention is to provide simple, inexpensive, automatic means for accomplishing the above results. A still further object of the invention is to provide, in the described equipment, a valve controlled escape passage so constructed and arranged that the passage is always closed except when the parts are rotating, and that the passage is opened, during rotation of the parts, by the effect of centrifugal force upon a simple, ball check valve, normally spring pressed to its seat. A still further object of the invention is to arrange the relief unit in such a fashion that the gas-escape passage is substantially radial with respect to the axis of rotation of the part with which it is associated, so that the effect of centrifugal force will positively prevent flow of liquid out from the interior of the housing through such path. A further object of the invention is to dispose the inlet mouth of such escape passage upon that surface of the relief unit which, during operation of the parts, trails, or faces away from the direction of rotation of the relief unit. Still further objects of the invention will appear as the description proceeds.

2

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
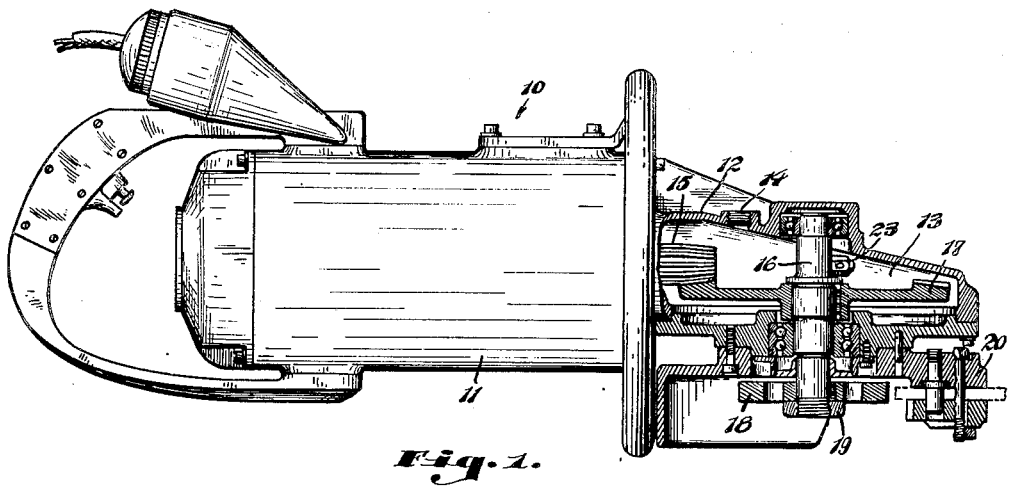
Fig. 1 is an elevation of the driving mechanism for a chain saw, showing the gear housing in section, and embodying my invention.
Figures 2, 3, 4:
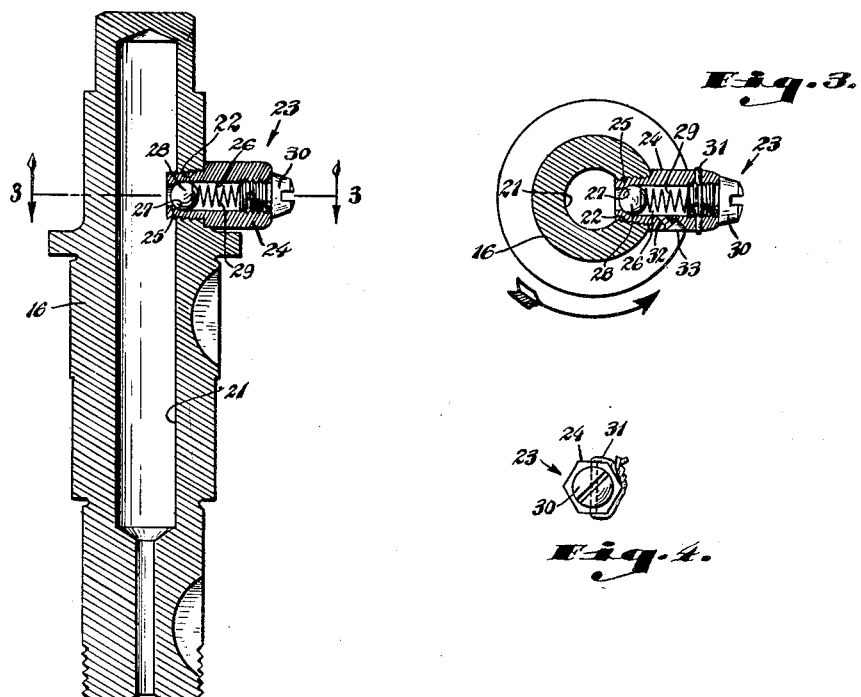
Fig. 2 is an enlarged axial section through the output shaft of the gear train illustrated in Fig. 1, showing a relief unit associated therewith in accordance with my invention.
Fig. 3 is a transverse section taken substantially on the line 3—3 of Fig. 2.
Fig. 4 is an end elevation of the relief unit.

While my invention, in its broad aspect, is, as indicated hereinabove, applicable to any lubricant-containing housing in which parts are journalled for rotation, I have chosen to illustrate it in connection with a chain saw. In the drawings, the reference numeral 10 indicates generally the drive mechanism for such a saw including a housing 11 in which is mounted an electric motor whose spindle 15 projects into the interior of a gear housing 12 suitably associated with the housing 11 and formed to provide a chamber 13. A filling opening 14 is adapted to be closed by a suitable plug (not shown) and an output shaft 16 is suitably journalled in the housing 12, one end of said shaft projecting to the exterior of the housing. Within the chamber 13, a gear 17 is carried by the shaft 16 in mesh with the toothed end of the spindle 15; and a sprocket 18 is carried on the projecting portion of the shaft 16 and secured in place by a nut 19 threaded on said shaft projection. The sprocket 18 is aligned with a saw chain (not shown) carried upon a cutter bar 20 suitably secured to the housing 12. All of this is standard construction.

The shaft 16 is hollow and, within the chamber 13, is formed with a tapered and threaded radial port 22 communicating with the interior 21 of said shaft. A relief unit, indicated generally by the reference numeral 23, comprises a tubular housing 24 one end 25 of which is tapered and threaded for fluid-tight reception in the threaded port 22. A valve seat 27 is formed in said housing 24 near the inner end thereof to control flow between the interior 21 of the shaft 16 and the valve chamber 26; and a ball 28 is received in said chamber 26 and urged, by a spring 29, into sealing contact with the seat 27. The outer end of the chamber 26 is closed by a plug 30 threadedly seated therein, a sealing wire 31 preferably being passed through registering openings in the valve housing 24 and the plug 30.

A passage 32 leads from the chamber 26 through the wall of the housing 24; and the mouth 33 of said passage opens through that face of the housing 24 which, during rotation of the shaft 16, trails, or faces away from the direction of rotation.

When the parts are quiescent, the spring 29 will hold the valve ball 28 in closing relation with the valve seat 27; thus, no matter what position the unit 10 may assume, fluid is prevented from flowing from the chamber 13 into the interior 21 of the shaft 16, and so to the atmosphere. When the unit is put into operation, the shaft 16 will rotate, at relatively high speed; and the effect of centrifugal force upon the ball 28 will overcome the effect of the spring 29, whereupon said ball will move off its seat to open communication between the chamber 13 and the atmosphere, through the passage 32, past the seat 27, and through the bore 21 of the shaft 16. Thus, any tendency of the rotating parts to build up a fluid pressure in the chamber 13 is overcome.

Because of the location and orientation of the passage 32, oil will never flow from the chamber 13 into the shaft bore 21, since the valve 28 is never open except at times when the shaft 16 is spinning at high speed, and under such circumstances, any oil in the passage 32 or in the chamber 26 will be thrown, by centrifugal force, outwardly through the passage 32 back into the chamber 13. There is very little tendency for oil to enter the passage 32, even before the shaft attains a speed such as to render centrifugal force effective, because the mouth 33 of said passage is disposed in the trailing face of the unit.

The saw is usually used either in the position illustrated in Fig. 1, in which the projecting end of the shaft 16 is directed vertically downwardly, or in a position rotated 90 degrees about the axis of the spindle 15, placing the shaft 16 in a horizontal position. The oil level normally maintained in the chamber 13 is just below the position of the unit 23; when the assembly is in the illustrated attitude. When the saw is used with the shaft 16 in a horizontal position, the unit 23 may splash into and out of the oil, at least at the beginning and at the end of operation, but loss of oil through the unit 23 is prevented, even under such circumstances, in the manner above-described. As a matter of fact, I believe that, once the parts come to operating speed, the effect of the rotation of the gear 17 upon the oil will be to hold the oil substantially in an annular ring around the outer rim of the chamber 13, with the shaft 16 substantially dry.

I claim as my invention:

1. The combination with a power-transmission gearing including a substantially fluid-tight housing, a hollow shaft journalled in said housing and projecting therefrom, the interior of said shaft opening to the atmosphere through the projecting portion thereof, a second shaft projecting into said housing, and gearing operatively connecting said shafts, of a pressure-relief fitting comprising a valve housing providing a chamber, said valve housing being carried on said hollow shaft within said fluid-tight housing and projecting from said hollow shaft at an angle to the axis of said hollow shaft, valve means controlling communication between the interior of said hollow shaft and said chamber, and means resiliently tending to retain said valve means in condition closing such communication, said chamber being in open communication with the interior of said housing, whereby, when said valve means is in condition to open such communication, the interior of said housing is vented to the atmosphere.

2. The combination of claim 1 in which said valve means comprises a seat in said chamber adjacent said hollow shaft and a valve element engageable with said seat to close such communication and movable away from the axis of said hollow shaft to open such communication.

3. The combination of claim 1 in which the communication between said chamber and the interior of said fluid-tight housing is through a port in said valve housing opening through that side of said valve housing which trails during rotation of said hollow shaft.

4. In combination, a substantially fluid-tight housing, a hollow shaft journalled in said housing and projecting therefrom, said shaft being provided, within said housing, with a substantially radial port, and a pressure relief fitting seated in and controlling said port, said fitting comprising a tubular member projecting outwardly from said shaft and providing a chamber communicating at one end with the interior of said shaft and opening near its other end to the interior of said housing, a valve seat near said one end of said fitting, a valve member cooperable with said seat, at times, to prevent fluid flow past said seat, and spring means in said chamber resiliently urging said valve member toward said one end of said fitting into flow-preventing cooperation with said seat, the interior of said shaft being in open communication with atmosphere.

5. The combination of claim 4 in which said chamber opens into the interior of said housing through a port whose mouth is located on that surface of said fitting which trails during rotation of said shaft.

6. The combination of claim 4 in which said chamber opens into the interior of said housing through a conduit inclined outwardly from the axis of said shaft.

7. The combination of claim 6 in which the mouth of said conduit is located on that surface of said fitting which trails during rotation of said shaft.

8. In combination, a substantially fluid-tight housing, a hollow shaft journalled in said housing and projecting therefrom, said shaft being provided, within said housing, with a laterally-opening port, a pressure relief fitting comprising a tubular housing having an open end fitted into said port, a valve seat in said tubular housing facing the other end of said tubular housing, a ball received in said tubular housing and cooperable with said seat, at times, to prevent fluid flow therepast, and a spring in said tubular housing bearing upon said ball and urging the same toward said seat, said tubular housing being provided with an outlet passage open to the interior of said fluid-tight housing.

9. The combination of claim 8 in which said outlet passage is inclined, as it leads from the interior of said tubular housing, away from the axis of said shaft.

10. The combination of claim 9 in which said outlet passage opens through that surface of said tubular housing which trails during rotation of said shaft.

11. The combination of claim 8 in which said outlet passage opens through that surface of said tubular housing which trails during rotation of said shaft.

12. The combination of claim 8 in which the port in said shaft is internally threaded, the open end of said tubular housing is externally threaded and is threadedly received in said port, the opposite end of said tubular housing is closed by a threaded plug against which said spring abuts, and means is provided for retaining said plug against removal.

CHARLES V. WOLFE.

REFERENCES CITED

The following references are of record in the file of this patent:

UNITED STATES PATENTS

| Number | Name | Date |
|---|---|---|
| 1,315,919 | Fisher | Sept. 9, 1919 |
| 1,882,716 | Angle | Oct. 18, 1932 |
| 1,978,835 | Cotterman | Oct. 30, 1934 |